United States Patent [19]
Anderson

[11] Patent Number: 4,578,666
[45] Date of Patent: Mar. 25, 1986

[54] METHOD OF COMPARING DATA WITH ASYNCHRONOUS TIMEBASES

[75] Inventor: Russell Y. Anderson, Hillsboro, Oreg.

[73] Assignee: Tektronix, Inc., Beaverton, Oreg.

[21] Appl. No.: 478,115

[22] Filed: Mar. 23, 1983

[51] Int. Cl.[4] .......................... G06F 7/02; G05B 1/00
[52] U.S. Cl. .................................................. 340/146.2
[58] Field of Search ................ 340/146.2; 375/116, 375/115; 364/200 MS File, 900 MS File

[56] References Cited

U.S. PATENT DOCUMENTS

| | | | |
|---|---|---|---|
| 3,654,604 | 4/1972 | Crafton | 340/146.2 |
| 3,855,576 | 12/1974 | Braun et al. | 340/146.2 |
| 4,027,261 | 5/1977 | Laurent et al. | 375/116 |
| 4,032,885 | 6/1977 | Roth | 340/146.2 |
| 4,065,639 | 12/1977 | Suzuki et al. | 375/116 |
| 4,151,511 | 4/1979 | Breikss | 340/146.2 |
| 4,344,180 | 8/1982 | Cummiskey | 375/116 |
| 4,353,130 | 10/1982 | Carasso et al. | 375/114 |
| 44,414,677 | 11/1983 | Ive et al. | 375/116 |

Primary Examiner—James D. Thomas
Assistant Examiner—Dale M. Shaw
Attorney, Agent, or Firm—Robert S. Hulse; George T. Noe; Daniel J. Bedell

[57] ABSTRACT

A method of comparing first and second data acquired asynchronously allows an effective comparison therebetween even if aliasing errors have occurred during acquisition thereof. Bits of the first and second data are compared in groups of three to obtain relationships therebetween. These relationships indicate if first data is equal to the second data, or the first data can be shifted right and/or left to achieve the second data. This comparison is repeated on successive groups of bits, but the comparison bits used in each data are shifted by a bit for each comparison. If any relationship indicates that the first data was shifted right (or left), then all other comparisons must indicate that the first data matches or is shifted right (or left), for the first data to be found the same as the second data. The presence of both right and left shift relationships indicates that the first and second data cannot be the same.

4 Claims, 4 Drawing Figures

FIG. 4

| SECOND DATA \ FIRST DATA | 000 | 001 | 00G | 010 | 011 | 01G | 0G0 | 0G1 | 0GG | 100 | 101 | 10G | 110 | 111 | 11G | 1G0 | 1G1 | 1GG | G00 | G01 | G0G | G10 | G11 | G1G | GG0 | GG1 | GGG |
|---|---|---|---|---|---|---|---|---|---|---|---|---|---|---|---|---|---|---|---|---|---|---|---|---|---|---|---|
| 000 | M | R | R | . | . | . | . | . | L | . | . | . | . | . | . | . | . | L | . | . | . | . | . | . | . | . | . |
| 001 | L | M | R | R | R | R | . | . | . | L | L | . | . | . | . | . | . | L | L | . | . | . | . | . | . | . | . |
| 00G | L | L | M | R | . | R | R | R | R | L | L | L | . | . | . | . | . | L | L | L | . | . | . | . | . | . | . |
| 010 | . | L | L | M | L | R | R | R | R | M | M | R | . | R | L | L | . | R | M | M | M | L | R | L | L | . | . |
| 011 | . | L | . | R | M | R | . | . | . | . | L | . | R | R | R | . | L | . | . | L | . | R | M | R | . | L | . |
| 01G | . | L | L | L | L | M | R | R | R | . | M | M | . | . | R | M | M | M | . | M | M | L | L | M | M | M | M |
| 0G0 | . | . | L | L | . | L | M | M | M | R | R | M | . | . | . | M | M | M | R | R | M | M | . | M | M | M | M |
| 0G1 | . | . | L | L | . | L | M | M | M | . | R | M | . | . | . | M | M | M | . | R | M | M | R | M | M | M | M |
| 0GG | . | . | L | L | . | L | M | M | M | . | . | M | . | . | M | M | M | . | R | M | M | . | M | M | M | M |
| 100 | R | R | R | L | . | . | L | . | . | M | R | R | L | . | . | . | . | . | M | R | R | L | . | . | L | . | . |
| 101 | . | R | R | M | R | M | L | L | . | L | M | R | L | . | L | R | R | R | L | M | R | M | R | M | L | L | . |
| 10G | . | . | R | M | . | M | M | M | M | L | L | M | L | . | L | R | R | R | L | L | M | M | . | M | M | M | M |
| 110 | . | . | . | L | L | . | . | . | . | R | R | R | M | L | R | . | . | . | . | . | . | L | L | . | . | . | . |
| 111 | . | . | . | . | L | . | . | . | . | . | . | . | R | M | R | . | . | . | . | . | . | . | L | . | . | . | . |
| 11G | . | . | . | L | L | L | . | . | . | . | R | R | L | L | M | R | R | R | . | . | . | L | L | L | . | . | . |
| 1G0 | . | . | . | R | . | M | M | M | M | . | L | L | . | . | L | M | M | M | R | M | M | R | . | M | M | M | M |
| 1G1 | . | . | . | R | R | M | M | M | M | . | L | L | . | . | L | M | M | M | . | M | M | R | R | M | M | M | M |
| 1GG | . | . | . | . | . | M | M | M | M | . | L | L | . | . | L | M | M | M | . | M | M | R | . | M | M | M | M |
| G00 | R | R | R | L | . | . | L | . | . | M | R | R | . | . | . | L | . | . | M | R | R | L | . | . | L | . | . |
| G01 | . | R | R | M | R | M | L | L | L | L | M | R | . | . | . | M | M | M | L | M | R | M | R | M | M | M | M |
| G0G | . | . | R | M | . | M | M | M | M | L | L | M | . | . | . | M | M | M | L | L | M | M | . | M | M | M | M |
| G10 | . | . | . | M | L | R | M | M | M | R | M | M | R | . | R | L | L | L | R | M | M | M | L | R | M | M | M |
| G11 | . | . | . | R | M | R | . | L | . | . | L | . | R | R | R | . | L | . | . | L | . | R | M | R | . | L | . |
| G1G | . | . | . | L | L | M | M | M | M | . | M | M | . | . | . | R | M | M | M | . | M | M | L | L | M | M | M | M |
| GG0 | . | . | . | R | . | M | M | M | M | R | R | M | . | . | . | M | M | M | R | M | M | M | . | M | M | M | M |
| GG1 | . | . | . | R | R | M | M | M | M | . | R | M | . | . | . | M | M | M | . | M | M | M | R | M | M | M | M |
| GGG | . | . | . | . | . | M | M | M | M | . | . | M | . | . | . | M | M | M | . | M | M | M | . | M | M | M | M |

FIG. 4

METHOD OF COMPARING DATA WITH ASYNCHRONOUS TIMEBASES

BACKGROUND OF THE INVENTION

The present invention relates to a method of comparing data signals which are asynchronous.

It is important to be able to compare the content of data signals acquired asynchronously. For example, a logic analyzer acquires a first data signal from a standard instrument and stores it in a reference memory. Thereafter, the logic analyzer acquires a second data signal from another signal source and stores the acquired data in an acquisition memory. The data stored in the acquisition memory is compared with the data in the reference memory e.g., for checking the operation of the instrument providing the second data signal. Often, when acquiring these data signals, a trigger circuit of the logic analyzer compares the input data or some other signal being monitored with a reference data pattern. When the reference data pattern occurs, this trigger circuit generates a trigger pulse to stop storing the input data. A comparison can now be made with the previously stored data.

When the logic data is acquired asynchronously, although the two data may be the same, the acquired data can appear differently because of sampling clock skew, slight variations in delays or timing, or the like. Even if the sampling clock frequencies are higher that the data rate, the above-described problem may not be solved because of the changes in the data placement relative to the sampling clock. One of these conditions is shown in FIG. 1, wherein a data signal A is a single logic signal train, and pulses B and C are asynchronous sampling clocks. The clocks B and C have the same frequency; however, the phases thereof are different from each other because the clock signals B and C are not synchronized with the logic signal A. Data signals D and E illustrate the sampled data with the clock signals B and C, respectively. The data signal D is obtained as described hereinafter. When the clock signal B occurs at a time $t_2$, the logic signal A is "Low" and therefore the analyzer stores the data as a "0". Since more than one transition has occurred between the times $t_2$ and $t_3$, the acquired data at the time $t_3$ is a glitch (G) which is a pulse narrower than the sampling clock period. One transition has occurred between the times $t_3$ and $t_4$, and the logic level of the signal A is "High" at the time $t_4$, so that the acquired data is "1". The similar operations are repeated, and thereby obtaining the data "0G1G0G1001" as the data signal D at the times $t_2$ through $t_8$. Similarly, the data E is "01G01G0101" acquired times $t_1$ through $t_7$. It should be noted that the data signal D is different from the data signal E, however, the logic signal A is common for the clock signals B and C. It should be noted that the sampling frequency is higher than the frequency of signal A between the times $t_5$ and $t_8$. The data signal D acquired at the times $t_6$ through $t_8$ is "1001", but the data signal E acquired at the $t_5$ through $t_7$ is "0101". These errors are commonly called aliasing errors. Prior techniques were unsuccessful in easily resolving comparison errors due to aliasing errors due to the asynchronous timebase.

SUMMARY OF THE INVENTION

The present invention can compare two logic data signals correctly even if they include aliasing errors. The input data is applied to a sampling circuit and a glitch detector, wherein the sampling circuit samples the input data in response to a sampling clock, and the glitch detector determines if more than one transition has occurred since the last clock. If so, this state will be stored as a glitch with the next sampling clock. The actual value (sampled by the sampling circuit) of this next sampling clock will be ignored, and this will be considered a glitch sample. The first and second data signals are acquired as described hereinbefore, and are stored in first and second memories respectively. The data is then read from the first and second memories three bits at a time, and a comparison is made between the first and second data signals to determine if they are the same, and also to determine if the first data signal values are the same if they are shifted left and/or right to achieve the second data signal values.

In order for the data to be equivalent, all comparisons must be either M (match) or R (shifted right) or they must be M or L (shifted left) for all values of the first and second data signals. If any three bits indicate that the data was shifted right, then all other comparisons must indicate that the data matches or is shifted right. If any comparison indicates a left shift, then all other comparisons must indicate either a left shift or a match. A mix of the right and left shifts is not sufficient and indicates that the first and second data signals are not the same.

It is therefore one object of the present invention to provide a method of comparing correctly first and second data signals acquired asynchronously.

It is another object of the present invention to provide a method for overcoming aliasing errors included when data signals are acquired asynchronously and later compared.

Other objects and advantages of the present invention will become apparent upon a reading of the following description when taken in conjunction with the accompanying drawings.

BRIEF DESCRIPTION OF THE DRAWINGS

FIG. 4 is a table for illustrating an example of a comparison between two data signals.

DETAILED DESCRIPTION OF THE INVENTION

Figure 2:
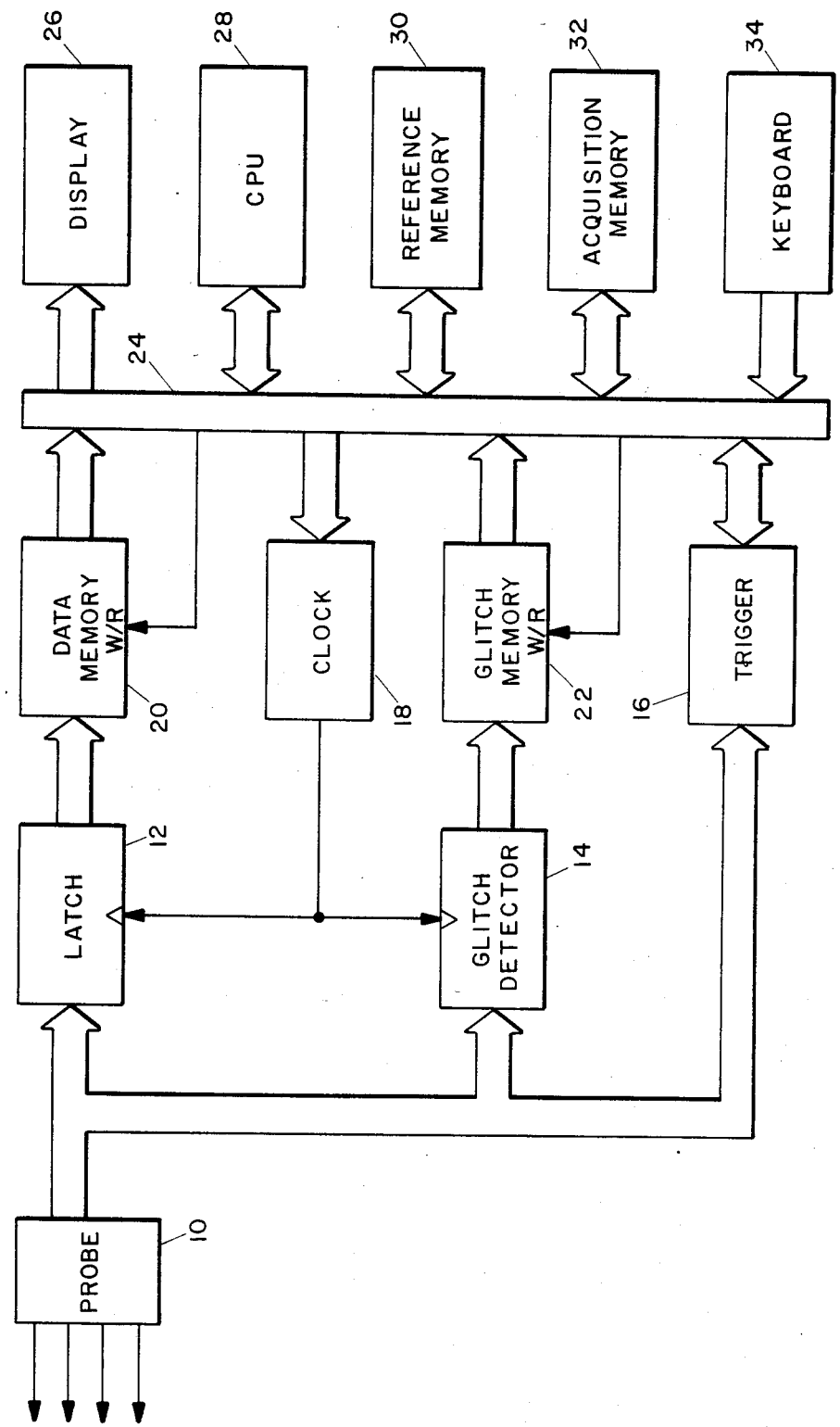
FIG. 2 is a block diagram of a logic analyzer in accordance with the preferred embodiment of the present invention.

Referring to FIG. 2, there is shown a block diagram of a logic analyzer using the present invention. Probe 10 has four tips to receive logic data from an instrument to be tested, and the output data therefrom is applied to latch circuit 12, glitch detector 14 and trigger circuit 16. Latch circuit 12 samples the input data in accordance with a clock signal from clock generator 18, and the sampled data is applied to data memory 20. Latch circuit 20 may be D flip-flops with the D input and output terminals receiving the data and the clock signal, respectively. Glitch detector 14 receives the clock signal from clock generator 18, and determines if more than one transition has occurred since the last clock. If so, glitch detector 14 stores a glitch indication in glitch memory 22. Glitch detector 14 may be constructed by logic circuits such as flip-flops and gates, a detailed description of a suitable glitch detector is disclosed in U.S. Pat. No. 4,353,032 assigned to the assignee of this application.

Trigger circuit 16 may be a conventional trigger circuit including a word recognizer for detecting a predetermined word from the input data, and a counter for providing a digital delay function. Memories 20 and 22 are high speed Random Access Memories (RAMs), and the stored data therefrom are applied to main bus 24 which contains appropriate data, address and control lines. The write/read mode of memories 20 and 22 are controlled in accordance with instructions transmitted via bus 24. The coded instructions received via bus 24 also control the oscillation frequency of clock generator 18 and the trigger condition of circuit 16. Trigger circuit 16 transmits the trigger signal via bus 24. Bus 24 couples display device 26 (which displays measurement results, operator set conditions or the like), central processing unit (CPU) 28, reference (first) memory 30, acquisition (second) memory 32, and keyboard 34 which is used by an operator in an input and control device. CPU 28 consists of a microprocessor such as a type 8080 or Z80A, a read only memory for storing processing sequences (microprograms) for the microprocessor, and a temporary memory. CPU 28 controls the entire operation of the logic analyzer including a comparison operation according to the present invention.

When acquiring the input data, data memory 20 and glitch memory 22 are in the write mode, and they store the output data from latch circuit 12 and glitch detector 14 in sequential memory locations. When trigger circuit 16 generates the trigger pulse, memories 20 and 22 are switched to the read mode. It should be noted that each address of data memory 20 has a corresponding address in glitch memory 22. CPU 28 causes the transfer of the contents of memories 20 and 22 to reference memory 30, wherein the contents of glitch memory 22 is stored instead of the contents of data memory 20 when a glitch is indicated in the memory of glitch memory 22. Thus, if any address of glitch memory 22 indicates a glitch occurrence, the data in the corresponding address of data memory 20 is ignored and a glitch data representation is stored in reference memory 30. If glitch memory 22 does not indicate the glitch occurrence, the actual value ("0" or "1") of data memory 20 is stored in reference memory 30.

Figure 1:
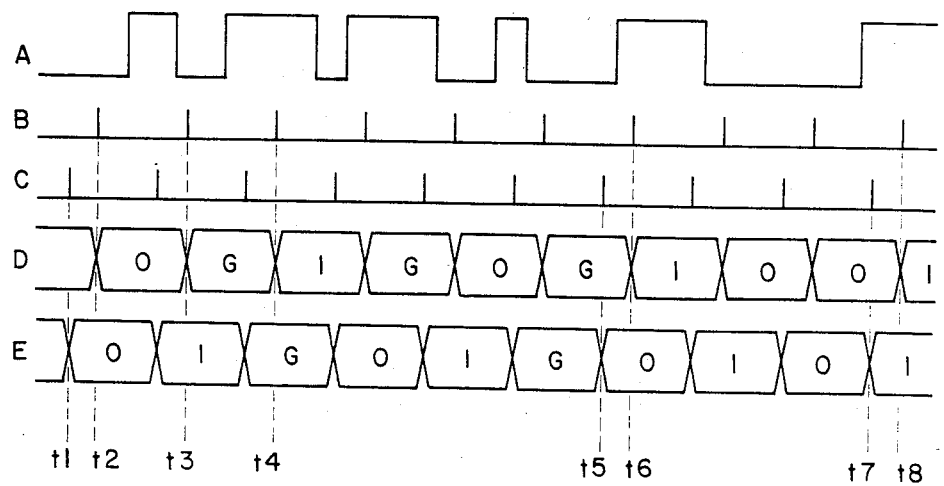
FIG. 1 is a time chart for explaining the preferred embodiment of the present invention.

Assuming that latch circuit 12 and glitch detector 14 receive the data signal A and the clock signal B shown in FIG. 1, reference memory 30 stores the digital representations of data signal D of FIG. 1, as "0G1G 0G10 01". This data is the first data signal.

Similarly to the foregoing operation, the logic analyzer acquires a second data signal, and these contents of data memory 20 and glitch memory 22 are transferred to acquisition memory 32 under control of CPU 28. The same procedure is followed as described above with respect to the priority of the glitch indications. Assuming that the relationship between the input data and the clock signal is the same as that of the data signal A and the clock signal C of FIG. 1, acquisition memory 32 stores, as digital representations of the second data signal, the data E, i.e., "01G0 1G01 01".

Figure 3:
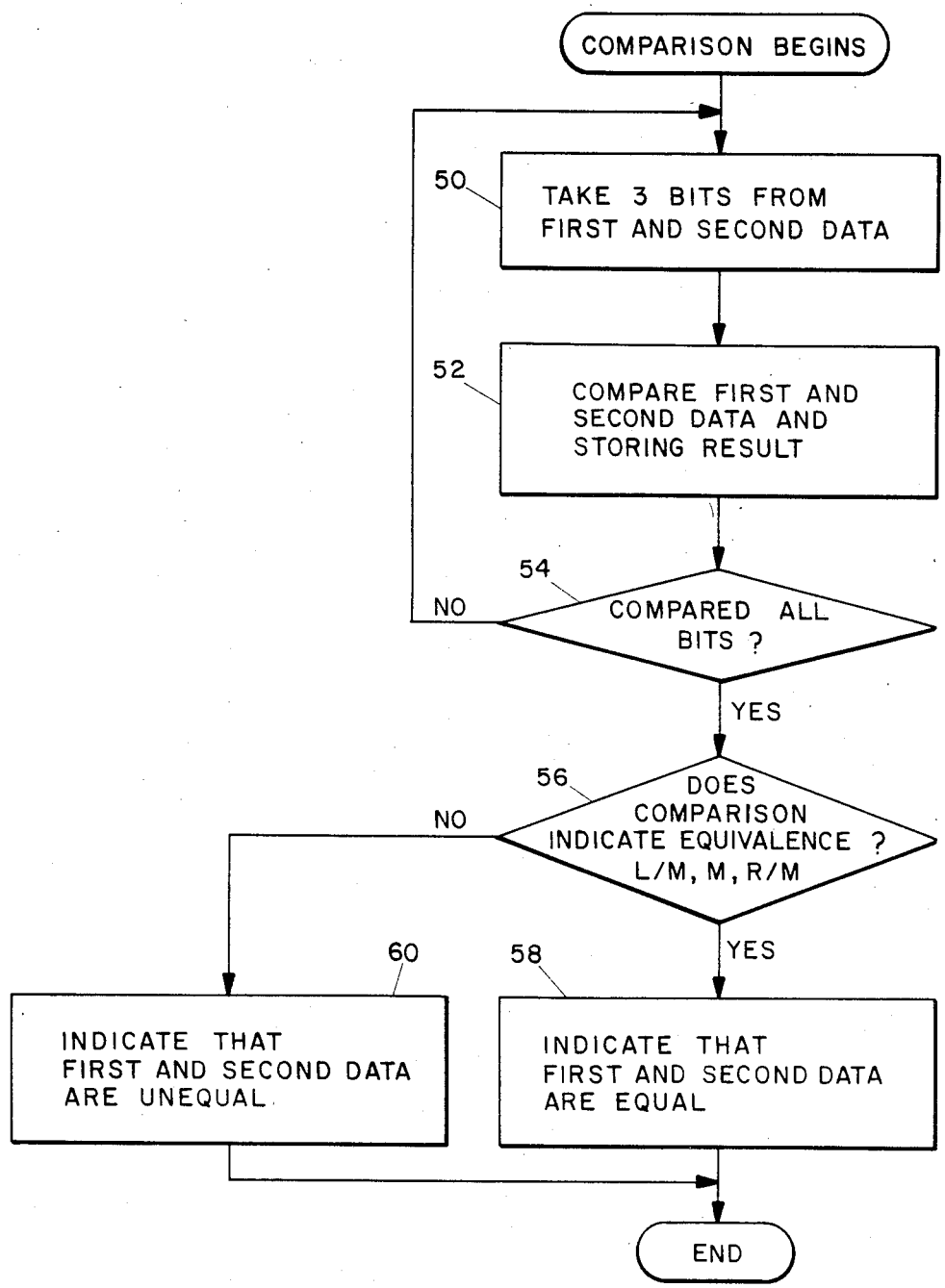
FIG. 3 is a flow chart for explaining the technique of the preferred embodiment.

The data comparison operation of the preferred embodiment occurs after the two memories 30 and 32 contain their respective data. The comparison operation will now be discussed in conjunction with FIG. 3. The following operations then occur under control of CPU 28. In the first step 50, CPU 28 takes each three bits from each memory, namely, the first, second and third bits, from memories 30 and 32. The respective bits from each memory are compared to determine that: the first data (from memory 30) is shifted left, equal, or shifted right with respect the second data (from memory 32). These comparison results are stored in the temporary memory of CPU 28 in step 52. There are three kinds of comparison results, i.e., M (match), R (shifted right) and L (shifted left), wherein the M means that the two data samples are the same. R and L means that the first data could be shifted right or left, respectively, to achieve the second data. The comparison is made in accordance with the relationships shown in FIG. 4, wherein the column and row are respectively determined by the first and second data. The comparison result "." means that there is no possible equivalent combination of the first and second data. For example, if the first data is "100" there is no possible equivalence if the second data is "011", "01G", "0G1", "0GG", "111", "11G", "1G0", "1G1", "1GG", "G11", "G1G", "GG1" or "GGG". The relationships of FIG. 4 are obtained by considering each possible comparison case, and then storing the results in a read only memory of CPU 28. In step 54, CPU 28 checks whether all bits in memories 30 and 32 have been compared. If not step 50 follows. In the next step 50, CPU 28 takes from each of memories 30 and 32 the next three bits, namely the second, third and fourth bits, from memories 30 and 32. Similarly, CPU 28 takes the third, fourth and fifth bits from the first and second data the third time step 50 is done. Thus, the three bits taken of the first and second data in memories 30 and 32, respectively, start at the bit position next following the first bit of the previous group of three bits taken. In other words, the bit that is the second bit in the group of three presently being compared will be the first bit during the next comparison.

In step 56, CPU 28 determines whether the comparison results in all the times step 52 was done are combinations of R and M or L and M. Even if the acquired first and second data include the aliasing, when the actual first data is the same as the actual second data, all comparisons must be either M or R, or they must be M or L for all comparisons. If any comparison indicates that the data was shifted right, then all other comparisons must indicate that the data matches or is shifted right. If any comparison indicates a left shift, then all other comparisons must indicate a left shift or a match for the data being compared to be considered equivalent. The above-described relation can be understood from the following fact. If a part of the first data could be shifted right (or left) to achieve the corresponding part of the second data, there is no possibility that another part of the first data could be shifted in the opposite direction, i.e. left (or right) to achieve another corresponding part of the second data. If the result of step 56 is "YES", step 58 provides an indication to the operator that the two data signals are equal. On the other hand, if not so, step 60 is performed to provide an indication that they are not equivalent data signals. Step 60 will be performed whenever the comparison results indicate both R and L, and whenever a "." result has been obtained during the comparison operations. The conclusion of step 58 or 60 may be displayed on display device 26.

The present invention will be further discussed by reference to FIGS. 1 and 4. Assume, as described hereinabove, that reference memory 30 stores the data "0G1G 0G10 01", and acquisition memory 32 stores the data "01G0 1G01 01". First, CPU 28 picks out the first three bits from these data, i.e., "0G1" from memory 30 and "01G" from memory 32. According to FIG. 4, the combination of "0G1" (the first data) and "01G" (the second data) is R. This R is stored in the temporary memory of CPU 28. Since the next three bits (shifted by one bit from the first three bits) are "G1G" as the first data and "1G0" as the second data, the comparison result is M. The third three bits are "1G0" and "G01" for the first and second data, and thereby deriving M as the comparison result. These operations are repeated as follows until the last three bits are taken by CPU 28.

```
0G1 (first)  — R
01G (second) /

G1G (first)  — M
1G0 (second) /

1G0 (first)  — M
G01 (second) /

G0G (first)  — M
01G (second) /

0G1 (first)  — M
1G0 (second) /

G10 (first)  — M
G01 (second) /

100 (first)  — R
010 (second) /

001 (first)  — R
101 (second) /
```

Since the comparison results are the combination of R and M, CPU 28 concludes that the first data D is the same as the second data E.

As can be understood from the foregoing, the present invention can identify correctly equivalent first and second data signals, even if their acquisition has involved aliasing errors. The present invention is a very effective feature as a comparison mode of a logic analyzer or the like.

It will be obvious to those having ordinary skill in the art that many changes may be made in the above-described details of the preferred embodiment of the present invention. For example, if L (or R) is detected in the comparison operation, the comparison may be stopped and the result displayed when R (or L) is thereafter detected, because one knows then the first data cannot be found to be equal to the second data. In the preferred embodiment, the present invention is controlled by CPU 28 under microprogram control, however, the present invention can be accomplished by using only hardware. In this instance, the relationship of FIG. 4 is stored in a memory device such as a ROM and the first and second data are applied to the address terminals of the memory. Bits 0, 1 and G of the data may be represented by "01", "10" and "11", respectively, and L, R and M of the comparison results may be represented by "100", "010" and "001", respectively. Thus, twelve address terminals and three data output terminals must be included for the memory. Each output terminal would be connected to a latch circuit, i.e., a first latch detects L, a second latch detects R and a third latch detects M. An AND gate receiving the outputs from the first and second latches would generate the output pulse, indicating the first and second data are not equal whenever both the "L" and "R" latches were set during a comparison.

Of course, the present invention can be applied to many data comparison operations including those involving sequential triggering. In addition, if all the comparison results are M, this result should be indicated to the operator via display 26. Similarly, if the comparison results are all R or are all L, the two data can be more assuredly indicated to be the same, not just equivalent. Therefore, the scope of the present invention should be determined only by the following claims.

I claim:

1. A method of comparing first and second data signals each comprising a sequence of digital bits acquired asynchronously, comprising the steps of:

(a) storing said first data signal in a first memory and said second data signal in a second memory;

(b) taking a predetermined number of bits of said first data signal from said first memory and a same number, not less than two, of corresponding bits of said second data signal from said second memory;

(c) obtaining a relationship of the bits taken from said first and second memories by comparing said bits of said first data signal directly with said corresponding bits of said second data signal, by shifting said bits of said first data signal to the left with respect to said corresponding bits of said second data signal and performing a comparison therebetween, and by shifting said bits of said first data signal to the right with respect to said corresponding bits of said second data signal and performing a comparison therebetween;

(d) repeating steps (b) and (c) by successively shifting one bit at a time over said sequence of bits of said first and second data signals; and (e) determining the equivalence of said first data and said second data in accordance with obtained relationships of said bits.

2. A method of comparing first and second data signals each comprising a sequence of digital bits acquired asynchronously, comprising the steps of:

(a) storing said first data signal in a first memory and said second data signal in a second memory;

(b) taking three bits of said first data signal from said first memory and a same number of corresponding bits of said second data signal from said second memory;

(c) obtaining a relationship of the bits taken from said first and second memories by comparing said bits of said first data signal directly with said corresponding bits of said second data signal, by shifting said bits of said first data signal to the left with respect to said corresponding bits of said second data signal and performing a comparison therebetween, and by shifting said bits of said first data signal to the right with respect to said corresponding bits of said second data signal and performing a comparison therebetween;

(d) repeating steps (b) and (c) by successively shifting one bit at a time over said sequence of bits of said first and second data signals; and (e) determining the equivalence of said first data and said second data in accordance with obtained relationships of said bits.

3. A method according to claim 2 wherein said equivalence is determined when said comparisons indicate for each successive operation any of a match of three corresponding bits and a match of two shifted bits in one direction only.

4. A method according to claim 2 wherein said first data and said second data are determined not be equivalent when said comparisons indicate a match of two shifted bits for both the left and right directions of shift of three bits of said first data signal with respect to said corresponding three bits of said second data signal.

* * * * *